(12) United States Patent
Aruga et al.

(10) Patent No.: US 10,252,455 B2
(45) Date of Patent: Apr. 9, 2019

(54) ETHYLENE-TETRAFLUOROETHYLENE COPOLYMER SHEET AND METHOD FOR PRODUCING SAME

(71) Applicant: AGC Inc., Chiyoda-ku (JP)

(72) Inventors: Hiroshi Aruga, Chiyoda-ku (JP); Tetsuya Hasegawa, Chiyoda-ku (JP); Sho Masuda, Chiyoda-ku (JP); Yoshiaki Higuchi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/419,265

(22) Filed: Jan. 30, 2017

(65) Prior Publication Data

US 2017/0136673 A1    May 18, 2017

Related U.S. Application Data

(63) Continuation of application No. PCT/JP2015/074284, filed on Aug. 27, 2015.

(30) Foreign Application Priority Data

Aug. 29, 2014 (JP) ................. 2014-175153

(51) Int. Cl.
*B29C 47/00* (2006.01)
*C08J 5/18* (2006.01)
*B29C 43/46* (2006.01)
*B29C 47/88* (2006.01)
*B29C 43/24* (2006.01)
*B29C 43/00* (2006.01)
*B29K 27/12* (2006.01)
*B29K 105/00* (2006.01)
*B29L 7/00* (2006.01)
*B29L 31/00* (2006.01)
*B29C 47/14* (2006.01)
*B29C 47/40* (2006.01)

(52) U.S. Cl.
CPC ........ *B29C 47/0004* (2013.01); *B29C 43/003* (2013.01); *B29C 43/24* (2013.01); *B29C 43/46* (2013.01); *B29C 47/004* (2013.01); *B29C 47/0021* (2013.01); *B29C 47/884* (2013.01); *C08J 5/18* (2013.01); *B29C 47/14* (2013.01); *B29C 47/40* (2013.01); *B29C 47/8845* (2013.01); *B29C 2043/462* (2013.01); *B29C 2043/467* (2013.01); *B29K 2027/12* (2013.01); *B29K 2105/0067* (2013.01); *B29K 2105/0085* (2013.01); *B29L 2007/002* (2013.01); *B29L 2031/755* (2013.01); *C08J 2323/08* (2013.01); *C08J 2327/18* (2013.01)

(58) Field of Classification Search
CPC ..... B29C 47/0004; B29C 43/46; B29C 43/24; B29C 47/884; B29C 47/004; B29C 47/0021; B29C 2043/467; C08J 5/18; C08J 2327/18; C08J 2323/08; B29K 2105/0067; B29K 2105/0085; B29K 2027/12; B29L 2007/002

See application file for complete search history.

(56) References Cited

U.S. PATENT DOCUMENTS

| | | | |
|---|---|---|---|
| 6,372,324 B1 | 4/2002 | Fujii et al. | |
| 9,312,412 B2 * | 4/2016 | O'Brien | B29C 47/0021 |
| 2015/0024189 A1 * | 1/2015 | Imaizumi | C08J 5/18 |
| | | | 428/220 |
| 2015/0252156 A1 * | 9/2015 | Kouketsu | B29C 47/0021 |
| | | | 526/253 |

FOREIGN PATENT DOCUMENTS

| | | | |
|---|---|---|---|
| EP | 0 963 832 A1 | 12/1999 | |
| JP | 61-63433 | 4/1986 | |
| JP | 3-188132 | 8/1991 | |
| JP | 5-32843 A | 2/1993 | |
| JP | 10-296840 | 11/1998 | |
| JP | 2002-240144 | 8/2002 | |
| JP | 2007-301976 | 11/2007 | |
| WO | WO 98/38022 | 9/1998 | |
| WO | WO 2013/125548 | 8/2013 | |
| WO | WO-2013125548 A1 * | 8/2013 | ............ C08J 5/18 |
| WO | WO 2014/103845 A1 | 7/2014 | |

OTHER PUBLICATIONS

[NPL-1] Atsushi (WO 2013/125548 A1) (Aug. 2018) (EPO—machine translation to English).*
International Search Report dated Dec. 1, 2015 in PCT/JP2015/074284 filed on Aug. 27, 2015.

* cited by examiner

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

An ethylene/tetrafluoroethylene copolymer sheet obtained by extrusion, has $R_0/d$, wherein $R_0$ is an in-plane phase difference [unit: nm]and d is a thickness, [unit: nm], of at most $3.0 \times 10^{-3}$, and a thickness of more than 300 μm. The ethylene/tetrafluoroethylene copolymer sheet preferably has a thickness of from 305 to 3,000 μm . A process for producing an ethylene/tetrafluoroethylene copolymer sheet includes melting an ethylene/tetrafluoroethylene copolymer to obtain a melt, continuously extruding the melt through a die for shaping the melt to a sheet, and letting the sheet pass between two rolls. One of the two rolls is a rigid roll, and the other is an elastic roll. The two rolls are pressed under a linear pressure of from 0.1 to 1,000 N/cm.

9 Claims, 4 Drawing Sheets

ETHYLENE-TETRAFLUOROETHYLENE COPOLYMER SHEET AND METHOD FOR PRODUCING SAME

TECHNICAL FIELD

The present invention relates to an ethylene/tetrafluoroethylene copolymer sheet and a process for producing it.

BACKGROUND ART

Heretofore, as a membrane material for a membrane structure building, an ethylene/tetrafluoroethylene copolymer (hereinafter sometimes referred to as "ETFE") sheet has been used (Patent Document 1).

A membrane material is, for example, fixed to a frame in the form of a quadrangle or the like and used as a membrane panel.

As a membrane panel, a tension type which is fixed to a frame in a planar shape by applying a tensile force from the periphery of the membrane material, or a cushion type such that two sheets of the membrane material are attached to a frame, and a space between the two sheets of the membrane material is filled with the air to inflate the sheets thereby to impart a tension to the membrane material, has been known.

PRIOR ART DOCUMENT

Patent Document

Patent Document 1: JP-A-2007-301976

DISCLOSURE OF INVENTION

Technical Problem

In recent years, considering the cost and the outer appearance, an increase in size of the membrane panel is demanded. In order to increase the size of the membrane panel, a membrane material to be used is required to have a higher mechanical strength. For example, a tensile stress at yield is required such that when an intense wind pressure is applied to the membrane panel, the membrane material is less likely to deform and even if it deforms, it can recover to the initial state when the window pressure is not applied any more.

Although an ETFE sheet which has been used as a membrane material has a sufficient mechanical strength in a size of a conventional membrane panel, for a large-sized panel, an ETFE sheet having a more excellent mechanical strength is required.

If a plurality of ETFE sheets are overlaid, the mechanical strength will improve, however, the transparency will decrease due to interfacial reflection, and such is unfavorable in application for which the transparency of the membrane material is required.

Figure 10:
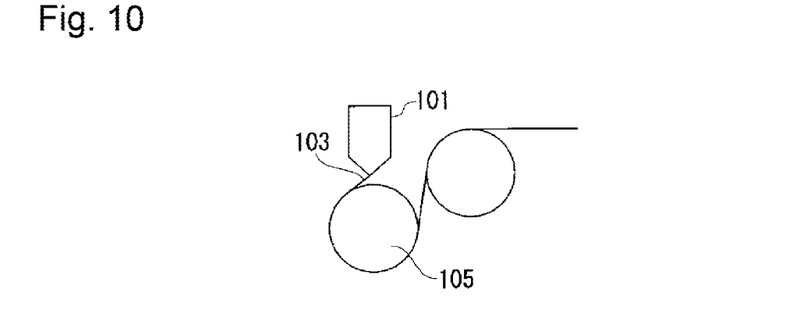
FIG. 10 is a view schematically illustrating an example of a conventional process for producing an ETFE sheet.

Accordingly, in order to improve the mechanical strength, it is considered to make the ETFE sheet thick. However, in such a case, the light transmittance may decrease, or the outer appearance may be insufficient. For example, as a method for producing an ETFE sheet commonly used as a membrane material, usually, in view of the productivity, a method may be employed in which an ETFE melt 103 extruded in a sheet-shape from a die 101 is brought into contact with the surface of a roll 105 and cooled, as shown in FIG. 10. In this method, if the thickness of the melt 103 exceeds 300 μm, the obtainable ETFE sheet will have defects in the outer appearance due to its own high weight.

An ETFE sheet being thick but having fewer defects can be produced by a compression molding method such as hot pressing, however, the productivity tends to be poor.

It is an object of the present invention to provide an ETFE sheet excellent in the mechanical strength and the outer appearance, which is formed by extrusion.

Another object of the present invention is to provide a production process capable of continuously producing an ETFE sheet excellent in the mechanical strength and the outer appearance by extrusion.

Solution to Problem

The present invention provides an ETFE sheet and a process for producing an ETFE sheet of the following [1] to [10].

[1] An ETFE sheet obtained by extrusion, which is characterized by having $R_0/d$ (wherein $R_0$ is an in-plane phase difference [unit: nm], and d is a thickness [unit: nm]) of at most $3.0 \times 10^{-3}$, and a thickness of more than 300 μm.

[2] The ETFE sheet according to [1], which has a thickness of from 305 to 3,000 μm.

[3] The ETFE sheet according to [1] or [2], wherein the total luminous transmittance satisfies the following formula (2):

$$100 \geq \text{total luminous transmittance}(\%) > (-0.022) \times (\text{thickness of ETFE sheet})(\mu m) + 96 \quad \text{Formula (2)}$$

[4] The ETFE sheet according to any one of [1] to [3], wherein the acoustic transmission loss with respect to a 500 Hz sound source satisfies the flowing formula (3):

$$\text{acoustic transmission loss}(dB) > 0.0085 \times (\text{thickness of ETFE sheet})(\mu m) + 1.58 \quad \text{Formula (3)}$$

[5] The ETFE sheet according to any one of [1] to [4], wherein the tensile stress at yield at 23° C. satisfies the following formula (4):

$$\text{tensile stress at yield}(N/cm) > 0.015 \times (\text{thickness of ETFE sheet})(\mu m) \quad \text{Formula (4)}$$

[6] The ETFE sheet according to any one of [1] to [5], which is a membrane material for a membrane structure building.

[7] A process for producing the ETFE sheet as defined in any one of [1] to [6], which comprises melting an ETFE to obtain a melt, continuously extruding the melt through a die for shaping the melt to a sheet, letting the sheet pass between two rolls as a pair and cooling the sheet,
wherein one of the two rolls is a rigid roll, and the other is an elastic roll,
wherein the two rolls are pressed under a linear pressure of from 0.1 to 1,000 N/cm,
wherein the temperature of the melt immediately before passage between the two rolls is from 200 to 330° C., and
wherein the average of the surface temperatures of the two rolls is from 50 to 180° C.

[8] A process for producing the ETFE sheet as defined in any one of [1] to [6], which comprises melting an ETFE to obtain a melt, continuously extruding the melt through a die for shaping the melt to a sheet, letting the sheet pass between two rolls as a pair and cooling the sheet,
wherein the two rolls are rigid rolls,
wherein between the two rolls, a gap of from 0.7 to 1.1 times the thickness of the ETFE sheet to be produced is provided, wherein the maximum thickness of the melt immediately before passage between the two rolls is from 1 to 1.4 times the above gap, wherein the temperature of the melt immediately before passage between the two rolls is from 200 to 330° C., and wherein the average of the surface temperatures of the two rolls is from 50 to 180° C.

[9] A process for producing an ETFE sheet, which comprises melting an ETFE to obtain a melt, continuously extruding the melt through a die for shaping the melt to a sheet, letting the sheet pass between two rolls as a pair and cooling the sheet, wherein one of the two rolls is a rigid roll, and the other is an elastic roll, wherein the two rolls are pressed under a linear pressure of from 0.1 to 1,000 N/cm, wherein the temperature of the melt immediately before passage between the two rolls is from 200 to 330° C., and wherein the average of the surface temperatures of the two rolls is from 50 to 180° C.

[10] A process for producing an ETFE sheet, which comprises melting an ETFE to obtain a melt, continuously extruding the melt through a die for shaping the melt to a sheet, letting the sheet pass between two rolls as a pair and cooling the sheet, wherein the two rolls are rigid rolls, wherein between the two rolls, a gap of from 0.7 to 1.1 times the thickness of the ETFE sheet to be produced is provided, wherein the maximum thickness of the melt immediately before passage between the two rolls is from 1 to 1.4 times the above gap, wherein the temperature of the melt immediately before passage between the two rolls is from 200 to 330° C., and wherein the average of the surface temperatures of the two rolls is from 50 to 180° C.

Advantageous Effects of Invention

The ETFE sheet of the present invention is excellent in the mechanical strength and the outer appearance.

According to the process for producing an ETFE sheet of the present invention, it is possible to continuously produce an ETFE sheet excellent in the mechanical strength and the outer appearance by extrusion.

DESCRIPTION OF EMBODIMENTS

The following definition of terms are applicable throughout the specification and Claims.

"A membrane structure building" means a building of which at least part of the roof, the outer wall, etc. is constituted by a membrane material.

"A monomer" means a compound having a polymerizable unsaturated bond such as a polymerizable carbon-carbon double bond.

"A unit based on a monomer" means a structural unit constituted by a monomer molecule formed by polymerizing the monomer, and a part of the monomer molecule may be lost by decomposition.

"A fluorinated monomer" means a monomer having a fluorine atom, and "a non-fluorinated monomer" means a monomer having no fluorine atom.

"A rigid roll" means a roll composed of a cylinder which has a radial thickness of at least 2 mm, of which the outermost layer material of the impression cylinder portion has a Young's modulus of at least $5 \times 10^4$ MPa.

"An elastic roll" means a roll composed of a cylinder, of which the outermost layer material of the impression cylinder portion has a Young's modulus of less than $5 \times 10^4$ MPa, or of which the outermost layer material has a Young's modulus of at least $5 \times 10^4$ MPa and which has a radial thickness of less than 2 mm.

"A gap" between two rolls means a distance where the two rolls are closest.

"Immediately before passage between two rolls" means a position 10 mm apart on the upstream side in a direction of flow of the molten resin, from a position where the two rolls are closest.

[ETFE sheet]

The ETFE sheet of the present invention is a sheet obtained by extrusion. That is, it is a sheet-shaped product obtained by melting ETFE, continuously extruding the melt from a die and cooling the extruded ETFE.

The ETFE sheet may be constituted by one type or two or more types of ETFE.

The ETFE may contain an additive.

(ETFE)

ETFE is a copolymer having units based on ethylene (hereinafter sometimes referred to as "ethylene units") and units based on tetrafluoroethylene ($CF_2=CF_2$, hereinafter sometimes referred to as "TFE") (hereinafter sometimes referred to as "TFE units").

ETFE may have units based on a monomer other than ethylene and TFE. The units based on another monomer may be one type or two or more types.

The ETFE may have at least one type of functional group (hereinafter sometimes referred to as "functional group (I)") selected from the group consisting of a carbonyl group-containing group, a hydroxy group, an epoxy group and an isocyanate group, on at least one of the main chain terminals and side chains. The functional group (I) contained may be one type or two or more types.

The carbonyl group-containing group is a group having a carbonyl group (—C(=O)—) in its structure, and may, for example, be a group having a carbonyl group between carbon atoms of a hydrocarbon group, a carbonate group, a carboxy group, a haloformyl group, an alkoxycarbonyl group or a dicarboxylic acid anhydride residue.

The hydrocarbon group may, for example, be a $C_{2-8}$ alkylene group. The number of carbon atoms in the alkylene group is a number of carbon atoms not including the carbonyl group. The alkylene group may be linear or branched.

The haloformyl group is represented by —C(=O)—X (wherein X is a halogen atom). The halogen atom in the haloformyl group may, for example, be a fluorine atom or a chlorine atom, and is preferably a fluorine atom. That is, the haloformyl group is preferably a fluoroformyl group (also called "a carbonyl fluoride group").

The alkoxy group in the alkoxycarbonyl group may be linear or branched, and is preferably a $C_{1-8}$ alkoxy group, particularly preferably a methoxy group or an ethoxy group.

Another monomer may, for example, be a fluorinated monomer or a non-fluorinated monomer.

The fluorinated monomer may, for example, be a fluoroethylene (excluding TFE) such as $CF_2=CFCl$ or $CF_2=CH_2$; a $C_{3-5}$ perfluoroolefin such as hexafluoropropylene (hereinafter sometimes referred to as "HFP") or octafluorobutene-1; a polyfluoroalkylethylene represented by $X^1(CF_2)_nCY^1=CH_2$ (wherein each of $X^1$ and $Y^1$ which are independent of each other, is a hydrogen atom or a fluorine atom, and n is an integer of from 2 to 8); a perfluorovinyl ether represented by $R^fOCF=CF_2$ (wherein $R^f$ is a $C_{1-6}$ perfluoroalkyl group which may have an oxygen atom between carbon atoms), a perfluorovinyl ether having a group capable of being easily converted to a carboxylic acid group or a sulfonic acid group, such as $CH_3OC(=O)CF_2CF_2CF_2OCF=CF_2$ or $FSO_2CF_2CF_2OCF(CF_3)CF_2OCF=CF_2$; a perfluorovinyl ether having at least two unsaturated bonds such as $CF_2=CFOCF_2CF=CF_2$ or $CF_2=CFO(CF_2)_2CF=CF_2$; or a fluorinated compound having an alicyclic structure such as perfluoro(2,2-dimethyl-1,3-dioxole), 2,2,4-trifluoro-5-trifluoromethoxy-1,3-dioxole or perfluoro(2-methylene-4-methyl-1,3-dioxolane).

In the polyfluoroalkylethylene represented by $X^1(CF_2)_nCY^1=CH_2$, n is preferably an integer of from 2 to 6, particularly preferably an integer of from 2 to 4. It may, for example, be specifically $CF_3CF_2CH=CH_2$, $CF_3(CF_2)_3CH=CH_2$, $CF_3(CF_2)_5CH=CH_2$, $CF_3CF_2CF_2CF=CH_2$ or $CF_2HCF_2CF_2CF=CH_2$.

The prefluorovinyl ether represented by $R^fOCF=CF_2$ may, for example, be specifically perfluoro(methyl vinyl ether), perfluoro(ethyl vinyl ether), perfluoro(propyl vinyl ether) (hereinafter sometimes referred to as "PPVE"), $CF_2=CFOCF_2CF(CF_3)O(CF_2)_2CF_3$, $CF_2=CFO(CF_2)_3O(CF_2)_2CF_3$, $CF_2=CFO(CF_2CF(CF_3)O)_2(CF_2)_2CF_3$, $CF_2=CFOCF_2CF_2OCF_2CF_3$ or $CF_2=CFO(CF_2CF_2O)_2CF_2CF_3$.

The perfluorovinyl ether represented by $R^fOCF=CF_2$ is preferably $R^{f1}OCF=CF_2$ or $R^{f1}OCFX^2(CF_2)_mOCF=CF_2$ (wherein $R^{f1}$ is a $C_{1-6}$ perfluoroalkyl group, $X^2$ is a fluorine atom or a trifluoromethyl group, and m is an integer of from 0 to 5).

The fluorinated monomer is preferably a fluoroethylene, a $C_{3-5}$ perfluoroolefin, a polyfluoroalkylethylene or a perfluorovinyl ether represented by $R^fOCF=CF_2$, particularly preferably HFP, $CF_3CF_2CH=CH_2$, $CF_3(CF_2)_3CH=CH_2$ or PPVE.

The non-fluorinated monomer may, for example, be a $C_{3-5}$ olefin such as propylene, butylene or isobutylene, a cyclic hydrocarbon compound having a dicarboxylic acid anhydride group and having a polymerizable unsaturated group in its cycle (hereinafter sometimes referred to as "a cyclic hydrocarbon monomer"), an unsaturated dicarboxylic acid, a vinyl ester or a vinyl alcohol.

The cyclic hydrocarbon monomer is preferably a polymerizable compound which is a cyclic hydrocarbon composed of at least one 5-membered ring or 6-membered ring and which has a dicarboxylic acid anhydride group and a cyclic polymerizable unsaturated group. The cyclic hydrocarbon monomer may, for example, be specifically itaconic anhydride, citraconic anhydride, 5-norbornene-2,3-dicarboxylic anhydride or maleic anhydride.

The unsaturated dicarboxylic acid may, for example, be itaconic acid, citraconic acid, 5-norbornene-2,3-dicarboxylic acid, citraconic acid or maleic acid.

The molar ratio of the ethylene units to the TFE units (ethylene units/TFE units) in ETFE is preferably from 25/75 to 75/25, particularly preferably from 30/70 to 60/40. The higher the proportion of ethylene, the more excellent the extrudability. The higher the proportion of the TFE units, the more excellent the durability such as the weather resistance of the ETFE sheet. When the molar ratio of the ethylene units to the TFE units is within the above range, both the properties are excellent.

The total amount of the ethylene units and the TFE units in ETFE is preferably from 75 to 100 mol %, particularly preferably from 85 to 99 mol % based on the total amount of all the units.

ETFE is preferably a copolymer having the ethylene units, the TFE units and units based on the following monomer (1), with a molar ratio of the ethylene units to the TFE units of from 25/75 to 75/25, with a proportion of the units based on the monomer (1) being from 0.5 to 25 mol % based on the total amount of the ethylene units and the TFE units. The proportion of the units based on the monomer (1) is particularly preferably from 1 to 15 mol %.

Monomer (1): At least one monomer selected from the group consisting of a polyfluoroalkylethylene, propylene, hexafluoropropylene, chlorotrifluoroethylene and a cyclic hydrocarbon monomer.

When the proportion of the units based on the monomer (1) is at least the lower limit of the above range, the resulting ETFE sheet will be more excellent in the physical properties such as the transparency and the tearing strength. When the proportion is at most the upper limit of the above range, the resulting ETFE sheet will be more excellent in the tensile strength and the elastic modulus in tension.

The melt flow rate (hereinafter sometimes referred to as "MFR") of ETFE is not particularly limited and is preferably from 1.5 to 80 g/10 min, particularly preferably from 3.0 to 40 g/10 min. When MFR is at least the lower limit of the above range, the internal stress is less likely to remain in the sheet at the time of extrusion, and the phase difference of the ETFE sheet tends to be small. When MFR is at most the upper limit of the above range, the ETFE sheet will be more excellent in the mechanical strength.

Here, in a case where ETFE is used as a mixture of at least two types of ETFE, MFR of ETFE is MFR of the entire ETFE mixture. MFR of the ETFE mixture is an average in accordance with the mass ratios of the respective ETFE components.

The melting point of ETFE is preferably from 150 to 300° C., particularly preferably from 170 to 270° C. When the melting point is at least the lower limit of the above range, the resulting ETFE sheet will be more excellent in the deformation resistance under a long-term load, and when it is at most the upper limit, ETFE will be excellent in the forming property, and the phase difference of the ETFE sheet tends to be smaller.

(Additive)

As the additive, a known additive may be properly used. It may, for example, be specifically an ultraviolet absorber, a light stabilizer, an antioxidant, an infrared absorbing agent, a flame retardant, a flame-retardant filler, an organic pigment, an inorganic pigment or a dye. In view of excellent weather resistance, an inorganic additive is preferred.

The content of the additive in the ETFE sheet is preferably at most 20 mass %, particularly preferably at most 10 mass % based on the total mass of the ETFE sheet.

($R_0/d$)

$R_0/d$ (wherein $R_0$ is the in-plane phase difference [unit: nm], and d is the thickness [unit: nm]) of the ETFE sheet of the present invention is at most $3.0 \times 10^{-3}$, preferably at most $2.5 \times 10^{-3}$, more preferably at most $2.0 \times 10^{-3}$, particularly preferably at most $1.0 \times 10^{-3}$. The lower limit of $R_0/d$ is preferably 0.

$R_0$ is the in-plane phase difference (also called "retardation") and is defined by the following formula (1):

$$R_0 = (Nx - Ny) \times d \quad (1)$$

Wherein (Nx−Ny) is a difference in the refractive index between in-plane orthogonal two directions (slow axis direction and propagation axis direction) of the ETFE sheet, and Nx≥Ny. d is the thickness [unit: nm] of the ETFE sheet as described above. That is, $R_0/d$ of the ETFE sheet is (Nx−Ny) and represents the in-plane birefringence.

$R_0/d$ is the index to the internal strain of the ETFE sheet. The internal strain is observed as defects such as streaks or waviness when the ETFE sheet is observed visually or by polarized light.

When $R_0/d$ is at most $3.0 \times 10^{-3}$, there is no forced orientation in the entire plane of the ETFE sheet, and the ETFE sheet is excellent in the outer appearance. Further, such an ETFE sheet tends to be excellent in the transparency, the sound insulating property and the mechanical property as compared with an ETFE sheet having the same thickness and having $R_0/d$ of higher than $3.0 \times 10^{-3}$.

$R_0/d$ can be adjusted by the conditions for production of the ETFE sheet.

In the case of continuous production by extrusion, if a bank (resin bank) is formed immediately before a sheet-shaped melt formed by melting ETFE and extruding the melt through a die, is let to pass between rolls as a pair, the resin will remain in the bank. By remaining of the resin, the internal strain will increase. Since such remaining of the resin is less likely to occur by the after-described production process, an ETFE sheet having $R_0/d$ of at most $3.0 \times 10^{-3}$ will be obtained.

Here, in the case of compression molding such as hot pressing, the internal strain is less likely to occur as compared with extrusion, however, as described above, the productivity tends to be poor. Further, since the melt cannot be quenched, the crystallinity of ETFE in the obtainable sheet tends to be high, and such an ETFE sheet is inferior in the transparency to the ETFE sheet of the present invention, as compared at the same thickness.

(Thickness)

The thickness of the ETFE sheet of the present invention is more than 300 μm, preferably from 305 to 3,000 μm, more preferably from 305 to 2,000 μm, particularly preferably from 400 to 1,500 μm. When the thickness is at least the lower limit of the above range, the ETFE sheet will be excellent in the absolute strength (load capacity per width). When the thickness is at most the upper limit of the above range, the ETFE sheet will be excellent in the transparency, and such a thickness is preferred also in view of weight saving.

(Transparency)

The total luminous transmittance of the ETFE sheet of the present invention preferably satisfies the following formula (2), particularly preferably satisfies the following formula (2-1).

$$100 \geq \text{total luminous transmittance}(\%) > (-0.022) \times (\text{thickness of ETFE sheet})(\mu m) + 96 \quad \text{Formula (2)}$$

$$100 \geq \text{total luminous transmittance}(\%) > (-0.020) \times (\text{thickness of ETFE sheet})(\mu m) + 96 \quad \text{Formula (2-1)}$$

The total luminous transmittance varies depending upon the composition (crystallinity) of ETFE and the rate of cooling the melt at the time of forming, even at the same thickness. When the rate of cooling the melt at the time of extrusion is increased, the crystallinity of ETFE is lowered, the total luminous transmittance is increased, and the formula (2) is likely to be satisfied.

(Sound Insulating Property)

The acoustic transmission loss of the ETFE sheet of the present invention with respect to a 500 Hz sound source preferably satisfies the following formula (3), particularly preferably satisfies the following formula (3-1).

$$\text{Acoustic transmission loss(dB)} > 0.0085 \times (\text{thickness of ETFE sheet})(\mu m) + 1.58 \quad \text{Formula (3)}$$

$$\text{Acoustic transmission loss(dB)} > 0.0090 \times (\text{thickness of ETFE sheet})(\mu m) + 1.58 \quad \text{Formula (3-1)}$$

Here, the acoustic transmission loss is the acoustic transmission loss with respect to a 500 Hz sound source when the ETFE sheet is extended on a rectangular opening of 1.68 m×1.79 m. The acoustic transmission loss of the ETFE sheet can be adjusted e.g. by the thickness or the elastic modulus of the ETFE sheet.

(Mechanical Strength)

The tensile stress at yield of the ETFE sheet of the present invention at 23° C. preferably satisfies the following formula (4), particularly preferably satisfies the following formula (4-1). When it satisfies the formula (4), it is possible to design a membrane structure such as a membrane panel without unnecessarily increasing the thickness.

$$\text{Tensile stress at yield(N/cm)} > 0.015 \times (\text{thickness of ETFE sheet})(\mu m) \quad \text{Formula (4)}$$

$$\text{Tensile stress at yield(N/cm)} > 0.017 \times (\text{thickness of ETFE sheet})(\mu m) \quad \text{Formula (4-1)}$$

Here, the tensile stress at yield is a value at 23° C. The tensile stress at yield of the ETFE sheet can be adjusted e.g. by the composition (crystallinity) of ETFE or by a strength-improving treatment such as stretching. For example, the higher the crystallinity of the ETFE, the higher the tensile stress at yield.

(Application)

The ETFE sheet of the present invention, which is excellent in the mechanical strength and the outer appearance, is suitable as a membrane material (such as a roof material, a ceiling material, an outer wall material, an inner wall material or a covering material) for a membrane structure building (such as a sport facility, horticultural facility or an atrium).

Further, it is useful not only as a membrane material for a membrane structure building but also as a plate material for outdoor use (for example, a sound-proof wall, a windbreak, an overtopping wave prevention fence, a garage canopy, a shopping mall, a sidewalk wall or a roof material), a glass shatter-resistant film, a heat resistant/water resistant sheet, a building material (for example, a tent material of a tent warehouse, a sunshade membrane material, a partial roof wall for skylight, a window material which will replace glass, a membrane material for a fire proofing partition wall, a curtain, an outer wall reinforcement, a waterproof membrane, a smokeproof film, an uninflammable partition wall, road reinforcement, interior (for example, lighting, a wall surface or a window shade), or exterior (for example, a tent or a signboard)), leisure goods (for example, a fishing rod, a racket, a gold club or a projection screen), a material for an automobile (for example, a hood, a vibration damper or a body), an aircraft material, a ship material, a home appliance outer packaging, a tank, a container inner wall, a filter, a membrane material for construction, an electronic material (for example, a printed board, a wiring board, an insulating film or a release film), a surface material of a solar cell module, a mirror protecting material for solar heat power generation, or a surface material of a solar water heater.

[Process for Producing ETFE Sheet]

The process for producing the ETFE sheet of the present invention is the following (1) or (2).

Production Process (1):

A process for producing an ETFE sheet, which comprises melting ETFE to obtain a melt, continuously excluding the melt through a die for shaping the melt to a sheet, letting the sheet pass between two rolls as a pair and cooling the sheet, wherein one of the two rolls is a rigid roll, and the other is an elastic roll, wherein the two rolls are pressed under a linear pressure of from 0.1 to 1,000 N/cm, wherein the temperature of the melt immediately before passage between the two rolls is from 200 to 330° C., and wherein the average of the surface temperatures of the two rolls is from 50 to 180° C.

Production Process (2):

A process for producing an ETFE sheet, which comprises melting ETFE to obtain a melt, continuously extruding the melt through a die for shaping the melt to a sheet, letting the sheet pass between two rolls as a pair and cooling the sheet, wherein the two rolls are rigid rolls, wherein between the two rolls, a gap of from 0.7 to 1.1 times the thickness of the ethylene/tetrafluoroethylene copolymer sheet to be produced is provided, wherein the maximum thickness of the melt immediately before passage between the two rolls is from 1 to 1.4 times the above gap, wherein the temperature of the melt immediate before passage between the two rolls is from 200 to 330° C., and wherein the average of the surface temperatures of the two rolls is from 50 to 180° C.

(First Embodiment)

A first embodiment is an example of the above-described production process (1).

Figure 1:
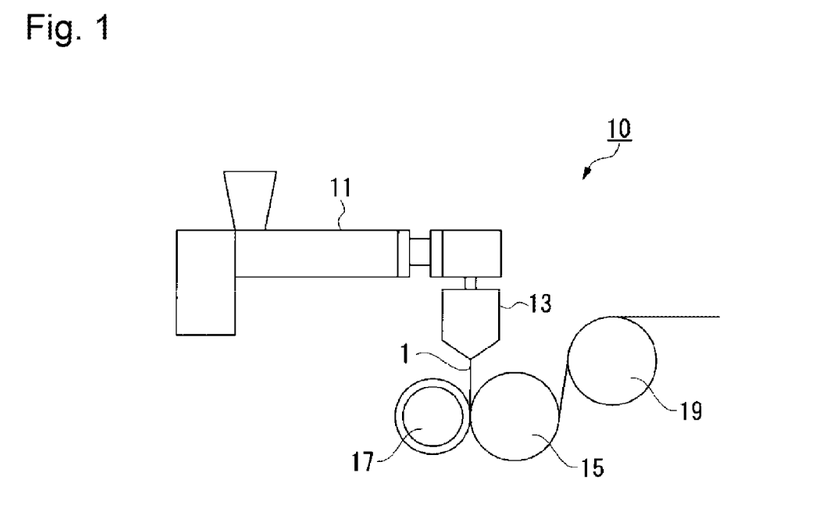
FIG. 1 is a view schematically illustrating a first embodiment of the process for producing an ETFE sheet of the present invention.

FIG. 1 is a view schematically illustrating the first embodiment of the process for producing an ETFE sheet of the present invention.

<Production Apparatus>

The production process according to the first embodiment is carried out by a production apparatus 10 comprising an extruder 11, a die 13 connected to the extruder 11, a rigid roll 15 and an elastic roll 17 as a pair, a release roll 19, and a winder (not shown).

The rigid roll 15 and the elastic roll 17 are disposed so that a melt 1 of ETFE extruded from the die 13 in a sheet shape can pass between them.

The extruder 11 is used to melt ETFE and continuously extrude the melt from the die 13 at an optional extrusion rate.

The extruder 11 is not particularly limited, and a known extruder such as a single screw extruder or a twin screw extruder may be used.

The die 13 is to shape ETFE melted in the extruder 11 to a sheet.

The die 13 may, for example, be a flat die (T die).

The rigid roll 15 is one capable of adjusting the surface temperature. As the rigid roll capable of adjusting the surface temperature, a roll known as a cooling roll or the like may be used. For example, a roll comprising an inner cylinder attached to the rotation axis and an outer cylinder disposed on the outside of the inner cylinder so that a heating medium (refrigerant) flows or is maintained between the inner cylinder and the outer cylinder, may be mentioned. In such a rigid roll, a heating medium heated or cooled to an optional temperature is made to flow between the inner cylinder and the outer cylinder, or a heating medium maintained between the inner cylinder and the outer cylinder is heated or cooled to an optional temperature, whereby the surface temperature of the outer cylinder, that is, the surface temperature of the rigid roll 15 can be controlled.

The radial thickness of the outer cylinder is preferably at least 2 mm, more preferably from 3 to 30 mm, particularly preferably from 5 to 20 mm. When the radial thickness is at least the lower limit of the above range, the rigid roll 15 is less likely to be deformed when pressurized e.g. by the elastic roll 17. When the radial thickness is at most the upper limit of the above range, an excellent temperature exchange property with the heating medium will be obtained. Further, the weight of the outer cylinder can be suppressed.

As the material of the rigid roll 15 (e.g. outer cylinder, inner cylinder), preferred is a material having a Young's modulus of at least $5 \times 10^4$ MPa. Further, it is preferably a highly heat resistant material, since it is brought into contact with a high temperature ETFE melt. For example, a metal or a ceramic may be mentioned.

Among them, in view of processability, a metal is preferred. The metal may, for example, be an iron alloy, stainless steel, an aluminum alloy or a nickel alloy.

In a case where the rigid roll 15 is made of a metal, the surface of the rigid roll 15 may be subjected to surface modification such as ceramic coating, ceramic sintering, ceramic deposition, cemented carbide thermal spraying, metal plating, carburizing or nitriding, in order to increase the hardness. The surface modification is, in a case where the rigid roll 15 is made of an iron-based material, in view of surface roughness, corrosion resistance and processability, preferably electrolytic chromium plating or electroless nickel plating.

The surface roughness of the rigid roll 15 is preferably at most 0.8 μm, more preferably at most 0.5 μm, particularly preferably at most 0.3 μm as a value of the center line average roughness Ra. When Ra is at most the above upper limit, the ETFE sheet surface will be smoothly finished. The surface being smooth is preferred in view of the light transmittance and the outer appearance.

The elastic roll 17 may, for example, be a covered roll having on its surface a covering made of a material selected from the group consisting of a rubber, an elastomer and a plastic, or a flexible metal roll.

The rubber constituting the covering on the covered roll may, for example, be a silicone rubber, an ethylene propylene diene rubber (EPDM), a neoprene rubber or a fluororubber. The elastomer may, for example, be a polyester type, a urethane type or a polyamide type. The plastic may, for example, be a fluororesin, a polysulfone or a polyamide.

The Young's modulus (elastic modulus in tension) of the rubber, the elastomer or the plastic is preferably from 1 to $5 \times 10^4$ MPa, particularly preferably from 3 to $5 \times 10^3$ MPa.

The radial thickness of the covering is preferably at least 0.25 mm, more preferably from 0.5 to 30 mm, particularly preferably from 1 to 20 mm. When the radial thickness is at least the lower limit of the above range, at the time of passage of the melt of ETFE between the rigid roll 15 and the elastic roll 17, the elastic roll 17 will sufficiently deformed, and internal strain is less likely to occur. When the radial thickness is at most the upper limit of the above range, an excellent temperature exchange property with the heating medium will be obtained.

The surface roughness of the covering is preferably at most 0.8 µm, more preferably at most 0.5 µm, particularly preferably at most 0.3 µm, as a value of the center line average roughness Ra, in the same manner as the surface roughness of the rigid roll 15. When Ra is at most the above upper limit, the ETFE sheet surface will be smoothly finished.

As the covered roll, one capable of adjusting the surface temperature is used. As the covering roll capable of adjusting the surface temperature, for example, a roll comprising an inner cylinder attached to the rotation axis, an outer cylinder disposed on the outside of the inner cylinder, and the above covering to cover the outer peripheral surface of the outer cylinder, so that a heating medium (refrigerant) flows or is maintained between the inner cylinder and the outer cylinder, may be mentioned.

Each of the outer cylinder and the inner cylinder may be the same as mentioned for the rigid roll 15.

The flexible metal roll may, for example, be a roll comprising a flexible outer roll made of a metal, and a soft base disposed on the inner side of and adjacent to the flexible outer cylinder. Such a roll will be deformed when the surface is pressurized e.g. by the rigid roll 15, since the outermost flexible outer cylinder has flexibility.

The radial thickness of the flexible outer cylinder is preferably less than 1.0 mm, more preferably from 0.05 to 0.7 mm, particularly preferably from 0.07 to 0.5 mm.

When the radial thickness is at most the above upper limit, deflection property can be secured, and when it is at least the lower limit, such a roll is excellent in the durability.

The surface roughness of the flexible outer cylinder is preferably at most 0.8 µm, more preferably at most 0.5 µm, particularly preferably at most 0.3 µm, as a value of the center line average roughness Ra, in the same manner as the surface roughness of the rigid roll 15. When Ra is at most the above upper limit, the ETFE sheet surface will be smoothly finished.

The soft base may, for example, be a rubber, an elastomer or a liquid. The rubber and the elastomer may be the same as mentioned above. In a case where the soft base is made of a liquid, a heating medium may be used as the liquid.

In a case where the soft base is a rubber or an elastomer, the thickness of the soft base is preferably at least 0.5 mm, more preferably from 1 to 30 mm, particularly preferably from 2 to 20 mm. When the thickness of the soft base is at least the lower limit of the above range, when the melt of ETFE passes between the rigid roll 15 and the elastic roll 17, the elastic roll 17 will be sufficiently deformed, and internal strain is less likely to occur. When the thickness of the soft base is at most the upper limit of the above range, an excellent temperature exchange property with the heating medium will be obtained.

In a case where the soft base is a liquid, the thickness of the soft base is preferably at least 0.3 mm, more preferably from 0.5 to 20 mm, particularly preferably from 1 to 15 mm. When the thickness of the soft base is at least the lower limit of the above range, at the time of passage of the melt of ETFE between the rigid roll 15 and the elastic roll 17, the elastic roll 17 will be sufficiently deformed, and internal strain is less likely to occur. When the thickness of the soft base is at most the upper limit of the above range, such a soft base is mechanically easily prepared, for example, the circularity is secured, particularly when a heating medium is enclosed as the liquid.

As the flexible metal roll, one capable of adjusting the surface temperature is used.

The flexible metal roll capable of adjusting the surface temperature may, for example, be typically a roll comprising an inner cylinder attached to the rotation axis, and a flexible outer cylinder made of a metal disposed on the outside of the inner cylinder, so that a liquid heating medium (refrigerant) flows or is enclosed between the inner cylinder and the outer cylinder.

The release roll 19 is used to release the melt 1 of ETFE transferred and cooled along the rigid roll 15, that is, an ETFE sheet, from the rigid roll 15, and transfer it to a winder (not shown).

The release roll 19 is not particularly limited, and may be a rigid roll or an elastic roll.

<Production Process>

The process for producing an ETFE sheet using the production apparatus 10 will be described.

ETFE is supplied to the extruder 11 and melted in the extruder 11, and the melt of ETFE is continuously supplied to the die 13 and is extruded into a sheet shape. The extruded melt 1 is let to pass between the rigid roll 15 and the elastic roll 17 disposed below the die 13, pressed under a predetermined linear pressure.

The rigid roll 15 and the elastic roll 17 are pressed under a predetermined linear pressure, and when the melt passes between them, the melt 1 is attached to the surface of the rigid roll 15 by the elastic roll 17. Further, the melt 1 is cooled from both sides by the rigid roll 15 and the elastic roll 17.

The melt 1 which has passed between the rigid roll 15 and the elastic roll 17 is further cooled while it moves along the rigid roll 15 rotating at a predetermined rate. The cooled melt 1 (ETFE sheet) is released from the rigid roll 15 by the release roll 19 and is further cooled as the case requires, and is transferred to the winder (not shown).

As ETFE, a commercial product may be employed, or one prepared by a known production method may be employed. The method for producing ETFE is not particularly limited, and a polymerization method using a radical polymerization initiator may be mentioned. The polymerization method is not particularly limited, and bulk polymerization, solution polymerization, suspension polymerization or emulsion polymerization may, for example, be mentioned.

An additive may be preliminarily added to ETFE to be supplied to the extruder 11, or an additive may be supplied together with ETFE to the extruder 11.

The temperature in the extruder 11 is at least the melting point of ETFE so as to melt ETFE, and is preferably from (melting point+10° C.) to (melting point+150° C.), particularly preferably from (melting point+20° C.) to (melting point+100° C.). When the temperature in the extruder 11 is least the above lower limit, a homogeneous melt can be obtained, whereby stable extrusion is possible. When the temperature in the extruder 11 is at most the above upper limit, deterioration of the materials due to heat decomposition can be suppressed.

A preferred temperature in the die 13 is also the same.

The linear pressure between the rigid roll 15 and the elastic roll 17 is from 0.1 to 1,000 N/cm, preferably from 5 to 1,000 N/cm, more preferably from 10 to 500 N/cm, particularly preferably from 30 to 300 N/cm. When the linear pressure is at least the lower limit of the above range, the melt 1 will be well attached to the rigid roll 15, and defects due to uneven pressing can be reduced. When it is at most the upper limit, when the melt 1 passes between the rigid roll 15 and the elastic roll 17, revolutions, drift or the like is less likely to occur in the interior of the melt 1, and an ETFE sheet with small internal strain is likely to be obtained. Further, the elastic roll 17 will have favorable durability.

The average of the surface temperature of the rigid roll 15 and the surface temperature of the elastic roll 17 (hereinafter sometimes referred to as "average surface temperature") is from 50 to 180° C., preferably from 60 to 170° C., particularly preferably from 70 to 150° C. When the average surface temperature is at most the upper limit of the above range, the melt 1 will be rapidly cooled when it passes between the rigid roll 15 and the elastic roll 17, the crystallinity of the ETFE tends to be low, and the obtainable ETFE sheet will be excellent in transparency. When the average surface temperature is at least the lower limit of the above range, the roll will be excellent in the adhesion to the sheet.

The surface temperature of the rigid roll 15 is preferably from 40 to 180° C., particularly preferably from 50 to 150° C. When the surface temperature of the rigid roll 15 is at least the lower limit of the above range, such a rigid roll 15 will be excellent in the adhesion to the sheet, and when it is at most the upper limit, the melt 1 will be rapidly cooled when it passes between the rigid roll 15 and the elastic roll 17, the crystallinity of the ETFE tends to be low, and the obtainable ETFE sheet will be excellent in the transparency.

The surface temperature of the elastic roll 17 varies depending upon the material of the surface of the elastic roll 17, and is preferably from 60 to 180° C., particularly preferably from 80 to 150° C. When the surface temperature of the elastic roll 17 is at least the lower limit of the above range, a special cooling method is not necessarily, such being excellent in operation property, and when it is at most the upper limit, the melt 1 will be rapidly cooled when it passes between the rigid roll 15 and the elastic roll 17, the crystallinity of the ETFE tends to be low, and the obtainable ETFE sheet will be excellent in the transparency and in addition, the life of the elastic roll is extended.

The temperature of the melt 1 immediately before passage between the rigid roll 15 and the elastic roll 17 is from 200 to 330° C., preferably from 220 to 320° C., particularly preferably from 240 to 310° C. When the temperature of the melt 1 is at least the lower limit of the above range, the melt will be rapidly cooled when it passes between the rigid roll 15 and the elastic roll 17, the crystallinity of the ETFE tends to be low, and the obtainable ETFE sheet will be excellent in the transparency. When the temperature of the melt 1 is at most the upper limit of the above range, deterioration of materials due to heat decomposition will be suppressed.

The temperature of the melt 1 immediately before passage between the rigid roll 15 and the elastic roll 17 may be adjusted e.g. by the temperature in the die 13 or the air gap. The air gap is a distance between the outlet of the die 13 and a cooling point. The cooling point is a position where the melt 1 extruded from the die is first in contact with the roll (one or both of the two rolls).

The air gap is preferably at most 200 mm, particularly preferably at most 150 mm. The winding rate (circumferential speed of the rigid roll 15) of the ETFE melt 1 is preferably from 0.3 to 50 m/min, particularly preferably from 0.5 to 20 m/min. When it is at least the lower limit, the productivity of the ETFE sheet will be excellent. When it is at most the upper limit, physical properties of the ETFE sheet, such as transparency, can be secured.

(Second Embodiment)

The second embodiment is an example of the above production process (1).

Figure 2:
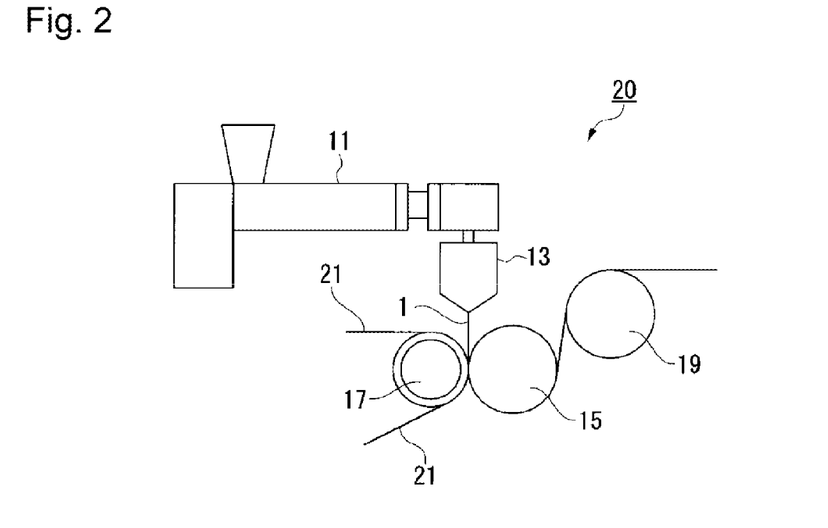
FIG. 2 is a view schematically illustrating a second embodiment of the process for producing an ETFE sheet of the present invention.

FIG. 2 is a view schematically illustrating the second embodiment of the process for producing an ETFE sheet of the present invention. In the following description, constituent corresponding to the first embodiment are represented by the same reference symbols, and their detailed description is omitted.

The production process according to the second embodiment is carried out by using a production apparatus 20. The production apparatus 20 is the same as the production apparatus 10 except that it further has a plastic film 21, and a second winder (not shown) to wind the plastic film 21.

The production process according to the second embodiment is different from the production process according to the first embodiment in that when the ETFE melt 1 is let to pass between the rigid roll 15 and the elastic roll 17, the plastic film 21 is let to flow together with the melt 1 on the elastic roll 17 side.

The material of the plastic film 21 may, for example, be a polyester resin such as polyethylene terephthalate, a polyamide resin or a polyimide resin.

The surface roughness of the plastic film 21 is preferably at most 0.8 μm, more preferably at most 0.5 μm, particularly preferably at most 0.3 μm, as a value of the center line average roughness Ra, in the same manner as the surface roughness of the rigid roll 15. When Ra is at most the above upper limit, the ETFE sheet surface will be smoothly finished.

In the second embodiment, by the plastic film 21 being let to flow together, an ETFE sheet having a high light transmittance and being excellent in the outer appearance can be produced even when an elastic roll having a relatively large surface roughness is used.

(Third Embodiment)

The third embodiment is an example of the above-described production process (2).

Figure 3:
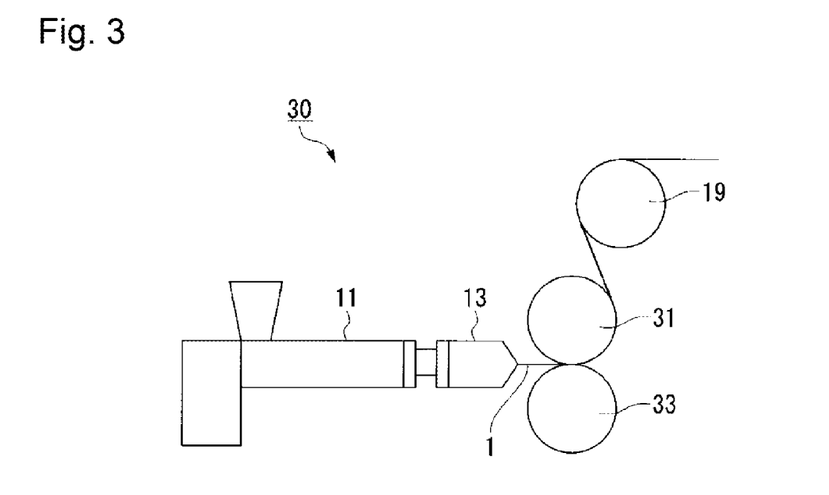
FIG. 3 is a view schematically illustrating a third embodiment of the process for producing an ETFE sheet of the present invention.

FIG. 3 is a view schematically illustrating the third embodiment of the process for producing an ETFE sheet of the present invention.

<Production Apparatus>

The production process according to the third embodiment is carried out by using a production apparatus 30 comprising an extruder 11, a die 13 connected to the extruder 11, a first rigid roll 31 and a second rigid roll 33 as a pair, a release roll 19 and a winder (not shown).

The first rigid roll 31 and the second rigid roll 33 are disposed so that a melt 1 of ETFE extruded from the die 13 in a sheet shape can pass between them.

The production apparatus 30 is the same as the production apparatus 10 except that the die 13 is disposed so that the outlet faces laterally, not downward, and that it comprises the first rigid roll 31 and the second rigid roll 33 instead of the rigid roll 15 and the elastic roll 17.

Each of the first rigid roll 31 and the second rigid roll 33 is the same as the rigid roll 15.

The first rigid roll 31 and the second rigid roll 33 may be the same or different from each other.

<Production Process>

The process for producing an ETFE sheet using the production apparatus 30 will be described.

ETFE is supplied to the extruder 11 and melted in the extruder 11, the melt of ETFE is continuously supplied to the die 13 and extruded to a sheet shape. The extruded melt 1 is let to pass between the first rigid roll 31 and the second rigid roll 33 disposed with a predetermined gap, disposed laterally to the die 13.

The gap between the first rigid roll 31 and the second rigid roll 33 is set to be from 0.7 to 1.1 times the thickness of the ETFE sheet to be produced, and when the melt passes between the rolls, the melt 1 is attached to the surface of the first rigid roll 31 by the second rigid roll 33. Further, the melt 1 is cooled from both sides by the first rigid roll 31 and the second rigid roll 33.

The melt 1 which has passed between the first rigid roll 31 and the second rigid roll 33 is further cooled while it moves along the first rigid roll 31 rotating at a predetermined rate. The cooled melt 1 (ETFE sheet) is released from the first rigid roll 31 by the release roll 19 and is further cooled as the case requires, and is transferred to a winder (not shown).

Preferred ranges of the temperature in the extruder 11 when ETFE is melted, the temperature in the die 13 and the winding rate of the ETFE melt 1 are the same as the first embodiment.

The gap between the first rigid roll 31 and the second rigid roll 33 is preferably from 0.75 to 1 time the thickness of the ETFE sheet to be produced.

The maximum thickness of the melt 1 immediately before passage between the first rigid roll 31 and the second rigid roll 33 is from 1 to 1.4 times, particularly preferably from 1 to 1.2 times the gap between the rolls.

The maximum thickness being at most the above upper limit means that no bank (resin bank) is formed, or even if a bank is formed, it is small as compared with conventional rolling. By rolling, a melt extruded from a die is let to pass between rigid rolls as a pair. On that occasion, if the amount of the bank formed immediate before rolling is too large, the sheet surface will have a wave pattern, and if the amount of the bank is too small, local recesses will occur on the sheet surface. Accordingly, formation of a sheet by rolling is carried out usually under conditions such that a bank of from about 1.5 to about 2 times the gap between rolls is to be formed. However, when an ETFE sheet is to be produced under such conditions, the resin cooled in the vicinity of the rolls remain in the bank, whereby the internal stress will increase. An ETFE sheet with a large internal strain tends to have high $R_0/d$ as mentioned above.

When the maximum thickness is at most the above upper limit, an ETFE sheet with small internal strain and having $R_0/d$ of at most $3.0 \times 10^{-3}$ can be produced. Even if local recesses somewhat occur on the surface by forming no bank or reducing its amount, small internal strain is preferred in use of the ETFE sheet as a membrane material for a membrane structure building.

The maximum thickness may be adjusted e.g. by the gap at the outlet of the die 1, the rotational speeds and the surface temperatures of the first rigid roll 31 and the second rigid roll 33, the melt and the rolls.

The average of the surface temperature of the first rigid roll 31 and the surface temperature of the second rigid roll 33 is from 50 to 180° C. in the same manner as the average surface temperature in the first embodiment, and the preferred range is also the same.

A preferred range of the surface temperature of the first rigid roll 31 is the same as the preferred range of the surface temperature of the rigid roll 15.

The surface temperature of the second rigid roll 33 is preferably from 40 to 170° C., particularly preferably from 50 to 140° C. When the surface temperature of the second rigid roll 33 is at least the lower limit of the above range, a special cooling method is not necessary, such being excellent in the operation property, and when it is at most the upper limit, the melt 1 will be rapidly cooled when it passes between the first and second rigid rolls, the crystallinity of the ETFE tends to be low, and the obtainable ETFE sheet will be excellent in the transparency. Further, by setting it to be lower than the first rigid roll, the second rigid roll will be excellent in release property from the sheet.

The temperature of the melt 1 immediately before passage between the first rigid roll 31 and the second rigid roll 33 is from 200 to 330° C. in the same manner as the first embodiment, and its preferred range is also the same.

The process for producing an ETFE sheet of the present invention is described above with reference to the first to third embodiments, however, the present invention is by no means restricted to such embodiments. The respective constitutions, combinations thereof, etc. in the above embodiments are merely examples, and within a range not to depart from the scope of the present invention, addition, omission, replacement and other modifications of constitutions are possible.

According to the above-described process for producing an ETFE sheet of the present invention, the ETFE sheet of the present invention can be produced. That is, according to the process for producing an ETFE sheet of the present invention, when the melt passes between two rolls as a pair, it is evenly and favorably in contact with the surface of one roll (rigid roll 15, first rigid roll 31). Further, according to the production process (1), a bank will not be formed immediately before the cooling point since one of the two rolls is an elastic roll, and according to the production process (2) also, a bank is not formed, or even if formed, its amount is very small. Accordingly, internal strain due to remaining of the cooled resin in the bank can be suppressed, and an ETFE sheet having a low $R_0/d$ can be obtained.

Further, according to the process for producing an ETFE sheet of the present invention, the melt is rapidly cooled when it passes between two rolls, whereby the crystallinity of ETFE is low, and an ETFE sheet excellent in the transparency is obtained.

EXAMPLES

Now, the present invention will be described in further detail with reference to Examples. However, it should be understood that the present invention is by no means restricted to the following description.

Among the after-mentioned Ex. 1 to 6, Ex. 1 to 3 are Examples of the present invention, Ex. 4 and 5 are Comparative Examples, and Ex. 6 is a Reference Example.

Evaluation methods employed in Ex. are shown below.
[Evaluation Method]
(Method for Measuring MFR)

MFR (unit: g/10 min) of ETFE was measured by a measurement method specified in ASTM D3159 at a temperature of 297° C. under a load of 49N.

(Method for Measuring Melting Point)

Using a differential thermal analyzer (manufactured by Seiko Instruments Inc., DSC7020), the temperature was increased in the air at a flow rate of 200 cm³/min at 10° C./min, and the temperature determined from an endothermic peak indicated by the first scan was taken as the melting point.

(Surface Roughness)

In accordance with "Nominal characteristics of contact (stylus) instruments" specified in JIS B0651: 1976, the center line average roughness Ra was measured under the following measurement conditions.

Measurement conditions: rate: 1.5 cm/min, measurement length: 4 mm, cutoff value: 0.8 mm.

Since it is difficult to directly measure the surface roughness in the case of a roll, a test specimen in the form of a flat plate was prepared from the same material via the same production procedure, and the surface roughness was measured by the above method.

(Total Luminous Transmittance)

A sheet prepared in each Ex. was cut into a 50 mm×50 mm square to prepare a sample, and the total luminous transmittance (%) was measured.

Measurement was carried out in accordance with JIS K7361-1: 1997 "Plastics-Determination of the total luminous transmittance of transparent materials-Part 1: Single beam instrument", using a turbidimeter (NDH5000 manufactured by NIPPON DENSHOKU INDUSTRIES, CO., LTD.), by disposing the sample at a right angle to the optical axis (so that the optical axis agrees with the Z-axis when the sheet was placed flat), and completely covering an opening (30 mm in diameter) of an integrating sphere, at room temperature. As the light source, D65 was used.

(Sound Insulation Property)

Two sheets prepared in each Ex. were overlaid, the edges were heat-sealed with a width of 10 mm to prepare an about 2.2 m square sheet as a sample.

Figures 4, 5:
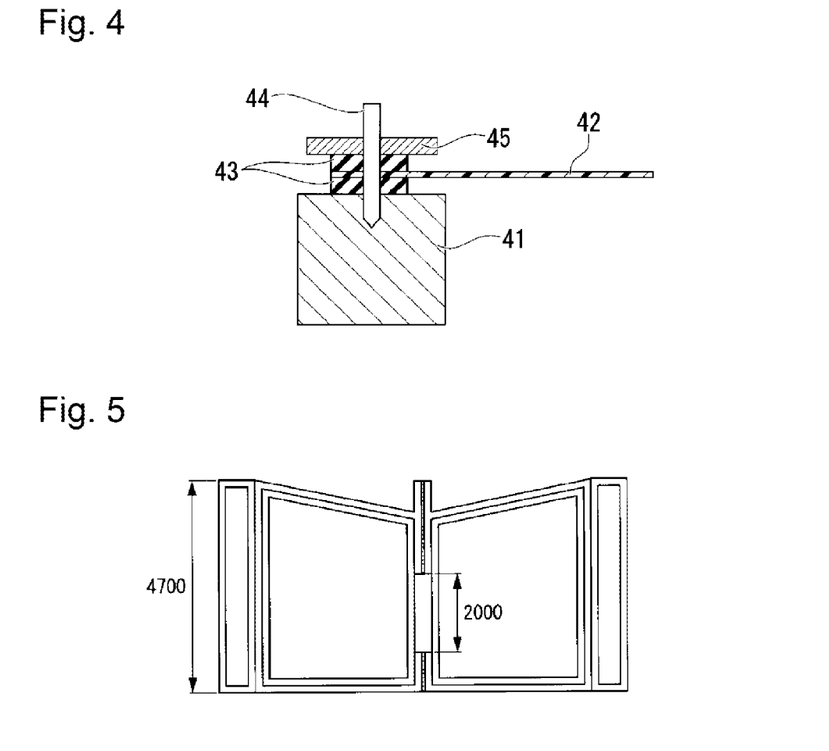
FIG. 4 is a view schematically illustrating a method for fixing a sample in evaluation of sound insulating property in Examples.
FIG. 5 is an elevation view illustrating an acoustic testing laboratory used in the above evaluation of sound insulating property.

Peripheral parts of the sample were fixed by a square bar so as to extend over a 1.68 m×1.79 m rectangular opening. For fixation, a method as shown in FIG. 4 was employed. That is, on one side of a square bar 41 made of wood of 10.5 cm in thickness and in width, a butyl rubber sheet 43 having a thickness of 2 mm, a sample 42, a butyl rubber sheet 43 having a thickness of 2 mm, and a steel material 45 having a thickness of 9 mm (hole drilling preliminarily applied at an interval of 150 mm) were laminated in this order, and a wood screw 44 was put from above the steel material 45 to fix the sample 42 on the square bar 41. The length of the square bar 41 was adjusted in accordance with the size of the rectangular opening to be formed. Each of the butyl rubber sheets 43 and the steel material 45 was one having a width narrower than the square bar 41 and having the same length as the square bar 41.

With respect to the fixed sample, the acoustic transmission loss (dB) with respect to a 500 Hz sound source was measured in accordance with JIS A1416: 2000 "Acoustics-Method for laboratory measurement of airbornesound insulation of building elements" in an acoustic testing laboratory in Asahi Glass Company, Limited. The acoustic testing laboratory is compartmentalized into compartment A and compartment B, and has an opening on the wall to compartmentalize the testing laboratory into compartment A and compartment B.

Figure 6:
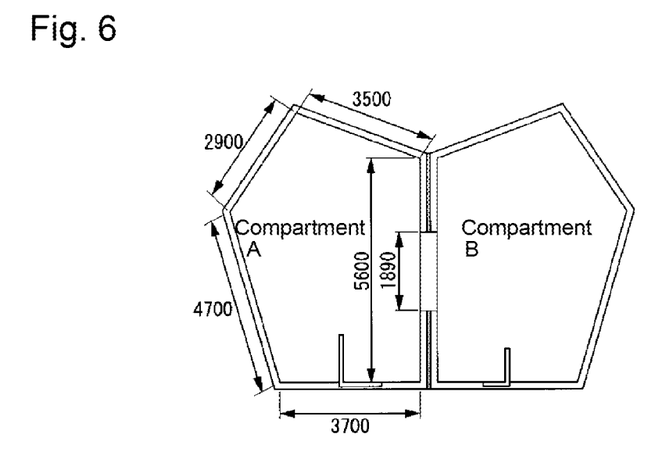
FIG. 6 is a plan view illustrating an acoustic testing laboratory used in the above evaluation of sound insulating property.

In FIGS. 5 and 6, an elevation view and a plan view illustrating the acoustic testing laboratory are shown. Unit of the numerical values in FIGS. 5 and 6 is mm. The specifications of the acoustic testing laboratory are shown below.

Shape: irregular heptahedron
Wall thickness: 25 cm concrete wall
Average height: 4.5 m
Interior surface area: 143 m²
Interior capacity: 117 m³
Opening dimensions: 1,890 mm in width, 2,000 mm in height.

(Tensile Stress at Yield)

In accordance with JIS K7127: 1999 "Plastics-Determination of tensile properties-Part 3: Test conditions for films and sheets", a No. 5 test specimen was punched out from the sheet prepared in each Ex.

With respect to the prepared No. 5 test specimen, a stress-strain curve was obtained at a temperature of 23±2° C. under a relative humidity of 60±10% at a pulling rate of 200 mm/min. The displacement was measured by using a non-contact digital video extensometer (DVE-10 manufactured by Shimadzu Corporation) by putting a marker between 25 mm gauge marks. From the obtained stress-strain curve, the tensile stress at yield was obtained.

Figure 7:
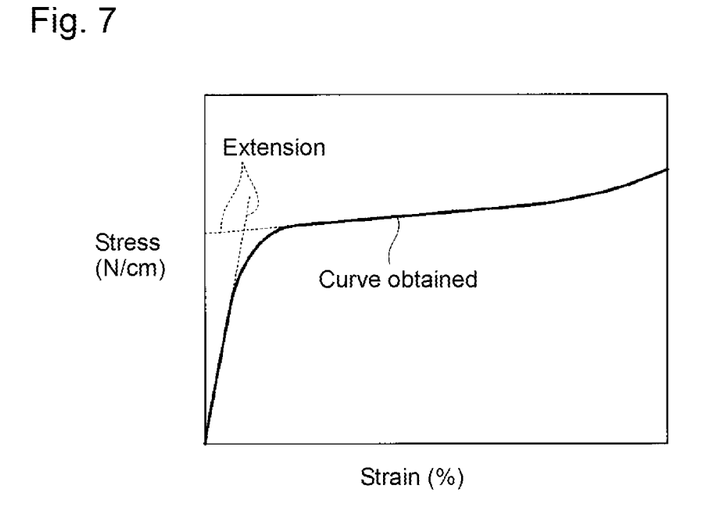
FIG. 7 is a diagram illustrating a method to determine the tensile stress at yield in Examples.

The stress-strain curve of the ETFE sheet is as identified in FIG. 7. Accordingly, as shown in FIG. 7, the stress value at an intersection of an extension of the gradient at a first stage where the stress linearly increases relative to the initial strain, and an extension of the gradient at a second stage where the increase of the stress relative to the strain is smaller than in the first stage, was taken as the tensile stress at yield.

($R_0/d$)

The sheet prepared in each Ex. was cut into a size of 50 mm×50 mm to prepare a sample.

With respect to the sample, the in-plane retardation (phase difference) at a wavelength of 500 nm was measured by using a retardation film and material evaluation system RETS-100 manufactured by Otsuka Electronics Co., Ltd., by the rotating analyzer method. Then, the retardation (nm) measured was divided by the thickness (nm) of the sample to determine $R_0/d$. A multichannel spectrophotometer was used as the detector, the measurement spot diameter was 5 mm, Glan-Thompson prism extension ratio $1 \times 10^{-5}$ automatic rotation (angle accuracy 0.1°) was employed as the polarizing unit for transmission, and a 100 W halogen lamp was employed as the light source for measurement.

(Flatness)

The sheet prepared in each Ex. was cut to a size of 0.5 m×0.5 m to prepare a sample.

The sample was heated at 100° C. for 2 hours on a flat polytetrafluoroethylene (hereinafter sometimes referred to as "PTFE") plate having a thickness of 10 mm placed in a hot air constant chamber oven, and then the sample and the PTFE plate were taken out and naturally cooled at room temperature for 16 hours. Then, the PTFE plate was removed, the sample was placed on a horizontal metal plate, and the maximum height (mm) at a position where the sample floated up from the metal plate by deformation of the sample was measured. The flatness was evaluated from the measurement results based on the following standards.

○ (good): Less than 2 mm.
Δ (fair): At least 2 mm and less than 5 mm.
x (poor): At least 5 mm.

The above maximum height is an index to deformation by internal strain relaxation. The shorter the maximum height, the less the internal strain in the sheet.

EX. 1

ETFE (manufactured by Asahi Glass Company, Limited, Fluon ETFE C-55AXP (product name), MFR: 6.2 g/10 min, melting point: 262° C.) was extruded under conditions as identified in Table 1 using a production apparatus having the same constitution as the preparation apparatus 10 shown in the first embodiment, to obtain an ETFE sheet having a thickness of 500 μm.

At the time of extrusion, the temperature of the melt of ETFE immediately before passage between the rigid roll 15 and the elastic roll 17 was 314° C.

Figure 8:
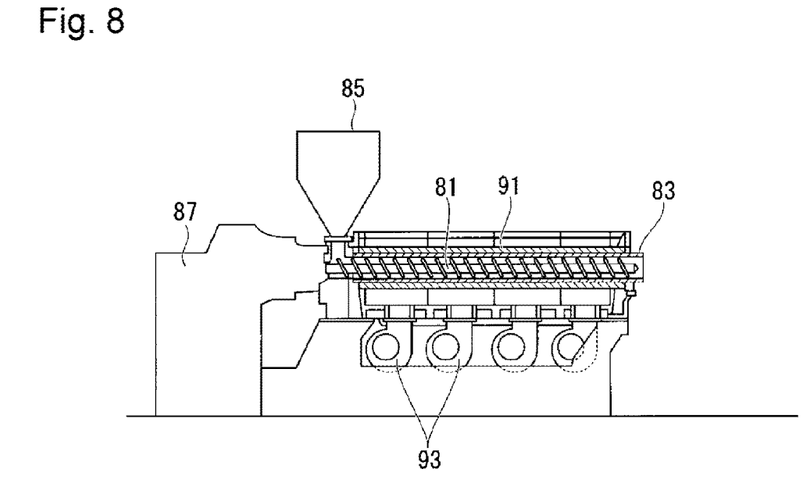
FIG. 8 is a cross-sectional view illustrating the structure of a single screw extruder used in Ex. 1 among Examples.

As the extruder 11, a single screw extruder 80 having the constitution as shown in FIG. 8 was used. The single screw extruder 80 comprises a screw 81, a barrel (cylinder) 83 to accommodate the screw 81, a hopper 85 connected to the upper stream of the barrel 13, a main body part 87 having a driving apparatus and a speed reducer controlling the revolutions of the screw 81, and a heater 91 and a blower 93 to heat or cool the interior of the barrel 83. A die 13 is connected to the tip of the barrel 83.

The aperture of the single screw extruder 80 (the inner diameter of the barrel 83) is 90 mm, L/D (screw length/screw diameter) is 32. As the die 13, a sheet-forming die made of a nickel alloy was used, and the width of the exhaust port of the die 13 was 1,020 mm, and the opening gap at the outlet of the die 13 was set at 1 mm.

As the rigid roll 15, a metal roll with a radial thickness of an outer cylinder of 6.0 mm was used. As the elastic roll 17, UF roll manufactured by Hitachi Zosen Corporation (flexible metal roll, radical thickness of outer cylinder: 0.2 mm) was used. The center line average roughnesses Ra of the surface of the rigid roll 15 and the surface of the elastic roll 17 were respectively 0.08 μm and 0.05 μm.

EX. 2 to 4

An ETFE sheet was obtained in the same manner as in Ex. 1 except that the forming conditions and the thickness of the ETFE sheet to be produced were as identified in Table 1.

TABLE 1

| | Temperature (° C.) | | Surface temperature (° C.) | | | Linear pressure (N/cm) | Winding rate (m/min) | Thickness of ETFE sheet (μm) |
|---|---|---|---|---|---|---|---|---|
| | Barrel (outlet) | Die | Elastic roll | Rigid roll | Average | | | |
| Ex. 1 | 330 | 330 | 114 | 145 | 129.5 | 60 | 2.6 | 500 |
| Ex. 2 | 330 | 330 | 144 | 166 | 155 | 60 | 2.6 | 500 |
| Ex. 3 | 330 | 330 | 114 | 145 | 129.5 | 60 | 1.8 | 1,000 |
| Ex. 4 | 330 | 330 | 114 | 145 | 129.5 | 60 | 6.8 | 300 |

EX. 5

ETFE was extruded by using a production apparatus having the same constitution as the production apparatus 30 shown in the third embodiment, setting the gap between the first rigid roll 31 and the second rigid roll 33 to be 0.45 mm, under the conditions as identified in Table 2, to prepare an ETFE sheet having a thickness of 500 μm.

At the time of extrusion, the temperature of the melt of ETFE immediately before passage between the rigid roll 15 and the elastic roll 17 was 297° C., and the maximum thickness (the thickness of the bank) was from 800 to 1,250 μm (from about 1.8 to about 2.8 times the gap between the rolls).

ETFE, the extruder 11 and the die 13 were the same as in Ex. 1.

As the first rigid roll 31, a metal roll with a radial thickness of the outer cylinder of 6.5 mm was used. As the second rigid roll 33, a metal roll with a radial thickness of the outer cylinder of 6.5 mm was used. The center line average roughnesses Ra of the surface of the first rigid roll 31 and the surface of the second rigid roll 33 were respectively 0.11 μm and 0.09 μm.

TABLE 2

| | Temperature (° C.) | | Surface temperature (° C.) | | | Gap (mm) | Winding rate (m/min) | Thickness of ETFE sheet (μm) |
|---|---|---|---|---|---|---|---|---|
| | Barrel (outlet) | Die | Elastic roll | Rigid roll | Average | | | |
| Ex. 5 | 320 | 320 | 139 | 145 | 142 | 0.45 | 2.5 | 500 |

EX. 6

Figure 9:
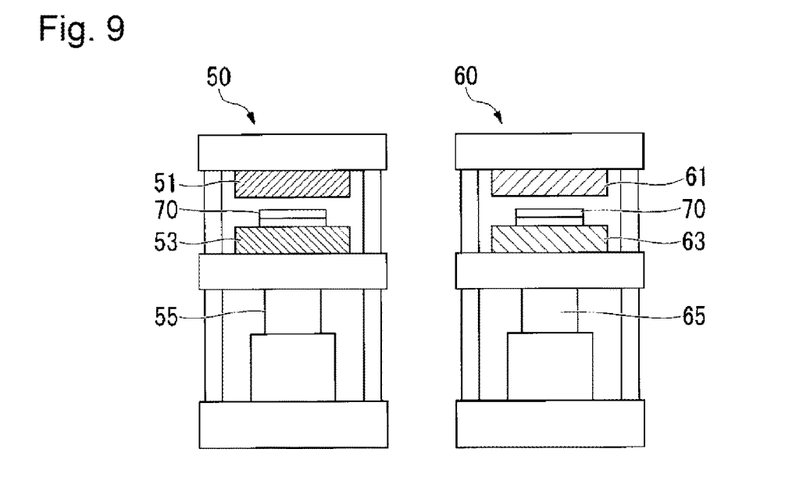
FIG. 9 is a side view illustrating the structure of a pressing machine used in Ex. 6 among Examples.

ETFE was formed by using a compression mold employing a carbon steel plate of 250×250×20 mm as each of the top force and the bottom force, by using a frame spacer having a thickness of 0.55 mm and a polyimide film having a thickness of 125 μm as each of top and bottom release films, by a pair of pressing machines (a hot pressing machine 50 and a cold pressing machine 60) as shown in FIG. 9 under the conditions as identified in Table 3, to obtain an ETFE sheet having a thickness of 500 μm.

The hot pressing machine 50 comprises a top heating plate 51, a bottom heating plate 53 and a pressure cylinder 55, the bottom heating plate 53 being moved upward by the pressure cylinder 55 for pressing. The cold pressing machine 60 comprises a top cooling plate 61, a bottom cooling plate 63 and a pressure cylinder 65, the bottom cooling plate 63 being moved upward by the pressure cylinder 65 for pressing.

Forming of ETFE was carried out by placing a compression mold 70 on the bottom heating plate 53 of the hot pressing machine 50, casting ETFE into the compression mold 70, followed by preheating and pressing (hot pressing), and then moving the compression mold 70 from the hot pressing machine 50 to the cold pressing machine 60 and placing the compression mold 70 on the bottom cooling plate 63, followed by pressing (cold pressing).

In Table 3, the heating plate temperature represents both the temperatures of the top heating plate 51 and the bottom heating plate 53. The cooling plate temperature represents both the temperatures of the top cooling plate 61 and the bottom cooling plate 63.

TABLE 3

| | Heating plate temperature (° C.) | Cooling plate temperature (° C.) | Pre-heating time (min) | Hot pressing time (min) | Applied pressure (N) | Cold pressing time (min) |
|---|---|---|---|---|---|---|
| Ex. 6 | 330 | 30 | 10 | 3 | 250 | 10 |

Of the ETFE sheets obtained in Ex. 1 to 6, $R_0/d$, $R_0$, the thickness, the total luminous transmittance, the acoustic transmission loss, the tensile stress at yield and the flatness are shown in Table 4. With respect to the thickness, the value by μm and the value (=d) as calculated by nm are shown. Further, the total luminous transmittance, the acoustic transmission loss, the tensile stress at yield and the flatness were represented based on the standards such that ○ (good): each satisfies the above formula (2), (3) or (4), x (poor): each does not satisfy the formula.

TABLE 4

| | $R_0/d$ | | Thickness | | Transparency Total luminous transmittance | Formula | Sound insulating property Acoustic transmission loss (dB at | Formula | Mechanical strength Tensile stress at yield | Formula | |
|---|---|---|---|---|---|---|---|---|---|---|---|
| | ($\times 10^{-3}$) | $R_0$ (nm) | d (nm) | (μm) | (%) | (2) | 500 Hz) | (3) | (N/cm) | (4) | Flatness |
| Ex. 1 | 0.8 | 400 | 500,000 | 500 | 87 | ○ | 7.1 | ○ | 9.7 | ○ | ○ |
| Ex. 2 | 0.8 | 400 | 500,000 | 500 | 86.8 | ○ | 7.1 | ○ | 9.8 | ○ | ○ |
| Ex. 3 | 0.5 | 500 | 1,000,000 | 1,000 | 76.2 | ○ | 14.1 | ○ | 19.3 | ○ | ○ |
| Ex. 4 | 1.1 | 330 | 300,000 | 300 | 89.3 | x | 5.3 | x | 5.8 | ○ | Δ |
| Ex. 5 | 6.9 | 3,450 | 500,000 | 500 | 85.9 | ○ | 7.2 | ○ | 9.5 | ○ | x |
| Ex. 6 | 0.7 | 350 | 500,000 | 500 | 84.5 | x | — | — | 9.8 | ○ | ○ |

As shown by the above results, the ETFE sheets in Ex. 1 to 3 were excellent in the transparency, the sound insulating property and the mechanical strength. By comparison between Ex. 1 and Ex. 2 in which the sheets were produced under the same production conditions except for the surface temperatures of the two rolls used at the time of production, among Ex. 1 to 3, it was found that the total luminous transmittance becomes higher as the surface temperature is lower.

Whereas the ETFE sheet in Ex. 4 having a thickness of 300 μm was inferior in the sound insulating property and the mechanical strength to Ex. 1 to 3. Further, the formula (2) was not satisfied, and the sheet was insufficient in the transparency per thickness.

The ETFE sheet in Ex. 5 having $R_0/d$ being at least $3.0 \times 10^{-3}$ had low flatness. This is considered to be because the internal stress was large since it was produced in a state where the thickness of the bank was from 800 to 1,250 μm (from about 1.8 to 2.8 times the gap between the rolls).

The ETFE sheet in Ex. 6 produced by compression molding was inferior in the transparency to the ETFE sheets in Ex. 1 to 2 having the same thickness. Further, the formula (2) was not satisfied, and the ETFE sheet was insufficient in the transparency per thickness. This is considered to be because the crystallinity of ETFE in the sheet is high.

This application is a continuation of PCT Application No. PCT/JP2015/074284 filed on Aug. 27, 2015, which is based upon and claims the benefit of priority from Japanese Patent Application No. 2014-175153 filed on Aug. 29, 2014. The contents of those applications are incorporated herein by reference in their entireties.

REFERENCE SYMBOLS

1: melt of ETFE, 10: production apparatus, 11: extruder, 13: die, 15: rigid roll, 17: elastic roll, 19: release roll, 20: production apparatus, 21: plastic film, 30: production apparatus, 31: first rigid roll, 33: second rigid roll, 41: square bar, 42: sample, 43: butyl rubber sheet, 44: wood screw, 45: steel material, 50: hot pressing machine, 51: top heating plate, 53: bottom heating plate, 55: pressure cylinder, 60: cold pressing machine, 61 top cooling plate, 63: bottom cooling plate, 65: pressure cylinder, 70: compression mold, 80: single screw extruder, 81: screw, 83: barrel, 85: hopper, 87: main body part, 91: heater, 93: blower, 101: die, 103: ETFE melt, 105: roll.

What is claimed is:

1. An ethylene/tetrafluoroethylene copolymer sheet, having $R_0/d$, wherein $R_0$ is an in-plane phase difference [unit: nm] and d is a thickness [unit: nm], of at most $1.0 \times 10^{-3}$, and a thickness of more than 300μm, wherein the ethylene/tetrafluoroethylene copolymer sheet is an extruded sheet.

2. The ethylene/tetrafluoroethylene copolymer sheet according to claim 1, wherein the ethylene/tetrafluoroethylene copolymer sheet has a thickness of from 305 to 3,000 μm.

3. The ethylene/tetrafluoroethylene copolymer sheet according to claim 1, wherein the total luminous transmittance of the ethylene/tetrafluoroethylene copolymer sheet satisfies formula (2):

$$100 \geq \text{total luminous transmittance (\%)} > (-0.022) \times (\text{thickness of ethylene/tetrafluoroethylene copolymer sheet) (μm)} + 96 \quad \text{formula (2)}.$$

4. The ethylene/tetrafluoroethylene copolymer sheet according to claim 1, wherein the acoustic transmission loss with respect to a 500 Hz sound source of the ethylene/tetrafluoroethylene copolymer sheet satisfies formula (3):

$$\text{acoustic transmission loss (dB)} > 0.0085 \times (\text{thickness of ethylene/tetrafluoroethylene copolymer sheet}) (\mu m) + 1.58 \quad \text{Formula (3)}.$$

5. The ethylene/tetrafluoroethylene copolymer sheet according to claim 1, wherein the tensile stress at yield at 23° C. of the ethylene/tetrafluoroethylene copolymer sheet satisfies formula (4):

$$\text{tensile stress at yield (N/cm)} > 0.015 \times (\text{thickness of ethylene/tetrafluoroethylene copolymer sheet}) (\mu m) \quad \text{Formula (4)}.$$

6. The ethylene/tetrafluoroethylene copolymer sheet according to claim 1, wherein the ethylene/tetrafluoroethylene copolymer sheet is a membrane material for a membrane structure building.

7. The ethylene/tetrafluoroethylene copolymer sheet according to claim 1, wherein the ethylene/tetrafluoroethylene copolymer sheet has a thickness of from 400 to 1,500 μm.

8. A process for producing the ethylene/tetrafluoroethylene copolymer sheet as defined in claim 1, the process comprising:
melting an ethylene/tetrafluoroethylene copolymer to obtain a melt;
continuously extruding the melt through a die for shaping the melt to a sheet;
letting the sheet pass between two rolls; and
cooling the sheet,
wherein one of the two rolls is a rigid roll, and the other is an elastic roll, wherein the two rolls are pressed under a linear pressure of from 0.1 to 1,000 N/cm, wherein the temperature of the melt immediately before passage between the two rolls is from 200 to 330° C., and wherein the average of the surface temperatures of the two rolls is from 50 to 180° C.

9. A process for producing an ethylene/tetrafluoroethylene copolymer sheet, the process comprising:

melting an ethylene/tetrafluoroethylene copolymer to obtain a melt;

continuously extruding the melt through a die for shaping the melt to a sheet;

letting the sheet pass between two rolls; and cooling the sheet, wherein one of the two rolls is a rigid roll, and the other is an elastic roll, wherein the two rolls are pressed under a linear pressure of from 0.1 to 1,000 N/cm, wherein the temperature of the melt immediately before passage between the two rolls is from 200 to 330° C., and wherein the average of the surface temperatures of the two rolls is from 50 to 180° C.

* * * * *